US011877961B2

(12) United States Patent
Moore

(10) Patent No.: US 11,877,961 B2
(45) Date of Patent: Jan. 23, 2024

(54) HANDSET HAVING A DISPLAY OF ZONES AND ICON SWITCHES FOR CONTROLLING MOVEMENT ASSOCIATED ELEMENTS OF A DEVICE SUCH AS A SURGICAL OPERATING TABLE

(71) Applicant: Eschmann Holdings Limited, Lancing (GB)

(72) Inventor: Colin Moore, Lancing (GB)

(73) Assignee: STERIS Solutions Limited, Leicester (GB)

( * ) Notice: Subject to any disclaimer, the term of this patent is extended or adjusted under 35 U.S.C. 154(b) by 707 days.

(21) Appl. No.: 17/044,410

(22) PCT Filed: Apr. 3, 2019

(86) PCT No.: PCT/EP2019/058412
§ 371 (c)(1),
(2) Date: Oct. 1, 2020

(87) PCT Pub. No.: WO2019/193058
PCT Pub. Date: Oct. 10, 2019

(65) Prior Publication Data
US 2021/0106483 A1    Apr. 15, 2021

(30) Foreign Application Priority Data
Apr. 5, 2018  (GB) .................................... 1805647

(51) Int. Cl.
*A61G 13/02* (2006.01)
*A61G 13/06* (2006.01)
(Continued)

(52) U.S. Cl.
CPC ............. *A61G 13/02* (2013.01); *A61G 13/06* (2013.01); *A61G 13/08* (2013.01); *G05B 15/02* (2013.01);
(Continued)

(58) Field of Classification Search
CPC ........ A61G 13/02; A61G 13/06; A61G 13/08; A61G 2203/12; A61G 2203/16;
(Continued)

(56) References Cited

U.S. PATENT DOCUMENTS 7,810,185 B2 * 10/2010 Burstner ................ A61G 13/02
5/616
2006/0080777 A1 * 4/2006 Rocher .................. A61G 13/08
5/618

(Continued)

FOREIGN PATENT DOCUMENTS

CN          2560334      2/2002
EP          1321121 A1   6/2003
(Continued)

OTHER PUBLICATIONS

Combined Search and Examination Report under Sections 17 and 18(3) issued in related GB application No. GB1805647.3 dated Oct. 8, 2019.

(Continued)

*Primary Examiner* — Chun Cao
(74) *Attorney, Agent, or Firm* — Polsinelli, P.C.

(57) ABSTRACT

A handset for controlling a device having a plurality of movable elements, the handset having a housing, a display on a front face of the housing, the display being divided into a plurality of zones, each zone including at least one icon switch, each icon switch being aligned with a respective associated icon, wherein each icon identifies a respective element or group of elements of a device to be controlled by the respective icon switch, and a plurality of physical switches on the front face, each physical switch being associated with a respective zone, and wherein each physical switch is configured to control movement of the element or elements shown by the icon or icons in the respective zone, and a control mechanism within the housing which is (Continued)

connected to the plurality of icon switches and the plurality of physical switches, the control mechanism being arranged to generate an output control signal for transmission to the device in response to an input command at the plurality of icon switches and the plurality of physical switches.

22 Claims, 2 Drawing Sheets

(51) Int. Cl.
*A61G 13/08* (2006.01)
*G05B 15/02* (2006.01)
*G06F 3/04817* (2022.01)
*G06F 3/0488* (2022.01)
*H01H 9/02* (2006.01)

(52) U.S. Cl.
CPC ........ *G06F 3/0488* (2013.01); *G06F 3/04817* (2013.01); *H01H 9/0235* (2013.01); *A61G 2203/12* (2013.01); *A61G 2203/16* (2013.01); *A61G 2203/20* (2013.01)

(58) Field of Classification Search
CPC ............... A61G 2203/20; A61P 35/02; A61K 2039/505; A61K 2039/54; A61K 2039/545; A61K 2300/00; A61K 31/506; A61K 31/635; A61K 39/3955; A61K 45/06; G05B 15/02; G06F 3/04817; G06F 3/0488

USPC ........................................................ 700/275

See application file for complete search history.

(56) References Cited

U.S. PATENT DOCUMENTS

| 2012/0194436 | A1* | 8/2012 | Thodupunuri ........ A61B 5/1115 345/168 |
| 2014/0250597 | A1* | 9/2014 | Chen .................. A61G 7/05769 340/12.54 |
| 2018/0008052 | A1 | 1/2018 | Kitckeberg et al. |
| 2021/0026530 | A1* | 1/2021 | Moore .................. A61G 13/08 |

FOREIGN PATENT DOCUMENTS

| EP | 1647213 A1 | 4/2006 |
| EP | 2716273 A2 | 4/2014 |
| FR | 2938427 A1 | 5/2010 |
| WO | 96/26615 A1 | 8/1996 |
| WO | 2013/071246 A1 | 5/2013 |

OTHER PUBLICATIONS

International Search Report and Written Opinion in related international application No. PCT/EP2019/058412 dated Jun. 4, 2019.
International Preliminary Report on Patentability in related international application PCT/2019/058412 dated Oct. 6, 2020.

* cited by examiner

HANDSET HAVING A DISPLAY OF ZONES AND ICON SWITCHES FOR CONTROLLING MOVEMENT ASSOCIATED ELEMENTS OF A DEVICE SUCH AS A SURGICAL OPERATING TABLE

FIELD OF THE INVENTION

The present invention relates to a handset for controlling a device having a plurality of movable elements, in particular a surgical operating table.

BACKGROUND

Surgical tables, or operating tables, have a variety of different well known configurations, for example comprising a base for standing on a floor, a column extending from the base, and a tabletop providing a patient support surface. There is a general need in the art for surgical tables to have variable height to enable the tabletop to be located at a defined height which is most suitable for the required surgical, therapeutic or diagnostic treatment of a patient positioned on the surgical table. The column is extendable, typically by a telescoping arrangement, to allow the column to be moved between contracted and extended positions in order to lower and/or raise the tabletop to a desired height. In other surgical tables, an arm, instead of a column, can lower and/or raise the tabletop to the desired height.

Still further, the tabletop of the surgical table is generally required to be movable relative to the column or arm so as to be tiltable about two orthogonal horizontal axes, namely a tilt axis extending longitudinally along the length of the tabletop and a trend axis extending transversely across the length of the tabletop.

In addition, the tabletop generally includes a number of independently movable segments. For example a head section, one or more torso sections and one or more leg sections.

It is well known to provide a handset to enable the various movement functions of the surgical operating table to be controlled. The handset may be wirelessly connected to the surgical operating table to be able to send movement commands to the table. Known handsets for controlling surgical operating tables typically comprise many push buttons associated with a variety of icons, and/or text. The icons and text are used to identify the movement available to the respective push button.

The most-used push buttons tend to be located in an array conveniently positioned for manual control. Examples of the most-used push buttons are: HEAD UP, HEAD DOWN, LEG UP, LEG DOWN, BACK UP, BACK DOWN, SLIDE CRANIALLY, SLIDE CAUDALLY, TREND, REVERSE TREND, AUTO LEVEL. Lesser used functions are typically available on a display screen, often several menu layers down.

These known handsets suffer from the problem that it can be time consuming and difficult for the healthcare operator to search for and select a push button, from the many push buttons provided, often in a small dimension array, to activate a desired movement of the table. Furthermore, the manual pressing of the selected button to activate the desired movement does not provide any significant visual, audible or touch feedback to the user. In addition, the speed of motion of the selected segment or the table is difficult to control or adjust using the push button. Typically, small adjustments to a selected movement requires the selection of another push button.

There is a need in the art to provide a handset, in particular a handset for controlling a surgical operating table, which has a more ergonomic design than known handsets, and in particular can more easily and/or more controllably enable movement commands to be readily selected for transmission to the device to be controlled.

SUMMARY OF THE INVENTION

The present invention provides a handset for controlling a device having a plurality of movable elements, the handset comprising a housing, a display on a front face of the housing, the display being divided into a plurality of zones, each zone including at least one icon switch, each icon switch being aligned with a respective associated icon, wherein each icon identifies a respective element or group of elements of a device to be controlled by the respective icon switch, and a plurality of physical switches on the front face, each physical switch being associated with a respective zone, and wherein each physical switch is configured to control movement of the element or elements shown by the icon or icons in the respective zone, and a control mechanism within the housing which is connected to the plurality of icon switches and the plurality of physical switches, the control mechanism being arranged to generate an output control signal for transmission to the device in response to an input command at the plurality of icon switches and the plurality of physical switches.

The present invention further provides a surgical operating table in combination with the handset of the present invention.

The present invention further provides method of controlling a surgical operating table using the handset of the present invention.

In a preferred embodiment of the present invention, the display is in the form of a screen, and for example may be a touchscreen display wherein the icon switches are touchscreen switches. However, alternatively the icon switches may comprise physical switches.

In this specification, the term "touchscreen display" is used in a broad sense to mean any device presenting the image of a screen with displayed icons which are touch sensitive. The touchscreen display may comprise a single unitary touchscreen device with displayed icons on a unitary screen and the touchscreen being touch sensitive so that pressing of the touchscreen in the vicinity of the icons activates a signal associated with the icon. Alternatively, the touchscreen display may comprise an array of plural individual displayed icons, each of which is associated with a respective switch device located beneath the respective icon.

Although the preferred embodiments relate to a handset configured to control a surgical operating table, the handset may be employed, or configured to be employed, to control the movement of any movable or adjustable surface or device.

The handset of the preferred embodiments provides a number of advantages over known handsets.

In the preferred embodiments of the present invention, the handset, which is preferably configured to be in the form of a tablet, has a minimum number of icon selector switches, which may be pushed to be selected and may be associated with the icon of a respective pre-defined movement function. The icon switches may be physical switches or may be incorporated into a touchscreen. The icon selector switches are arranged in groups, typically vertical groups. Each group has a physical switch, for example a colour-coded physical switch, associated therewith. The physical switch can be pushed, slid or rotated, and the movement represents the corresponding desired movement of the device to be controlled, such as the surgical operating table. Each group is also associated with a particular movement orientation, typically either vertical, horizontal or rotational. In addition, the orientation of the movement is identified with a corresponding physical shape of the physical switches.

Accordingly, the handset can employ a minimum number of movement function icon selector switches, which are, for example, touchscreen switches with associated icons. The physical switches can control the direction and speed of movement in a respective movement orientation. For example, an output speed control signal can be generated by moving each respective physical switch away from the central position, and a speed value associated with the output speed control signal increases with increase in distance of the respective physical switch away from the central position. Increased pressure applied to the switch, or increased movement of the switch away from a central position, can act to increase the speed of the selected movement.

The number of physical switches, for example physical switches which extend above the display surface and are designed for manual operation by pressing, sliding or rotating for example, can also be minimised.

The icon switches, which may be touchscreen switches with associated icons, can provide haptic and/or visual feedback to the user when selected. Additionally or alternatively, the physical switches can provide haptic and/or visual feedback to the user when selected. In either case, the haptic and/or visual feedback may indicate to the user that the selected function is being executed and/or that a limit of allowed travel or a function stop is imminent or has been reached.

The display surface, particularly when it is a touchscreen surface, is easy to clean, which is important in a sterile environment of an operating theatre.

The handset can be safely controlled by a user in a surgical or other medical environment. A desired icon, for example a touchscreen icon, is pressed to select a desired movement of a selected element of the device, or the entire device. The icon is highlighted to confirm its selection. The corresponding physical switch is then moved, for example by pressing, sliding or rotation, with the switch movement corresponding to the desired direction and speed of movement. Release of the physical switch returns the physical switch to a central position and terminates movement.

The ergonomic design of the preferred embodiments is convenient for left-handed or right-handed use, and can be used in a single-handed operation, particularly when the handset is mounted to or securely supported by a support. The tablet design and shape can enable the handset readily to be placed securely and stably on a surface. In one embodiment, the rear surface of the handset may be provided with a non-slip high friction material e.g. an elastomer, which may form a part of the housing or be attached as a cover.

BRIEF DESCRIPTION OF THE DRAWINGS

Embodiments of the present invention will now be described by way of example only with reference to the accompanying drawings, in which.

DETAILED DESCRIPTION

Figure 1:
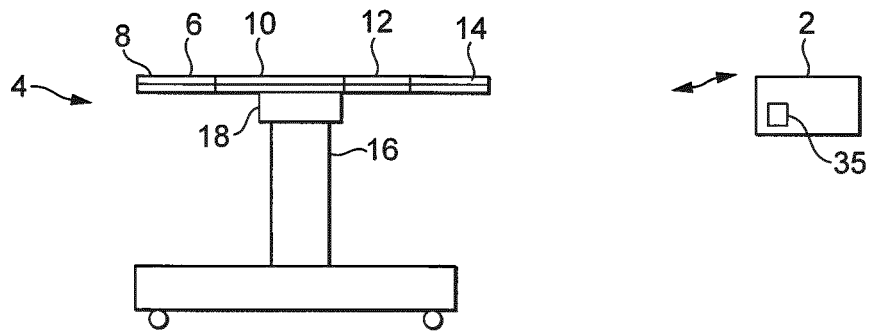
FIG. 1 is a schematic view of a handset according to an embodiment of the present invention in combination with a surgical operating table to be controlled by the handset.
Figure 2:
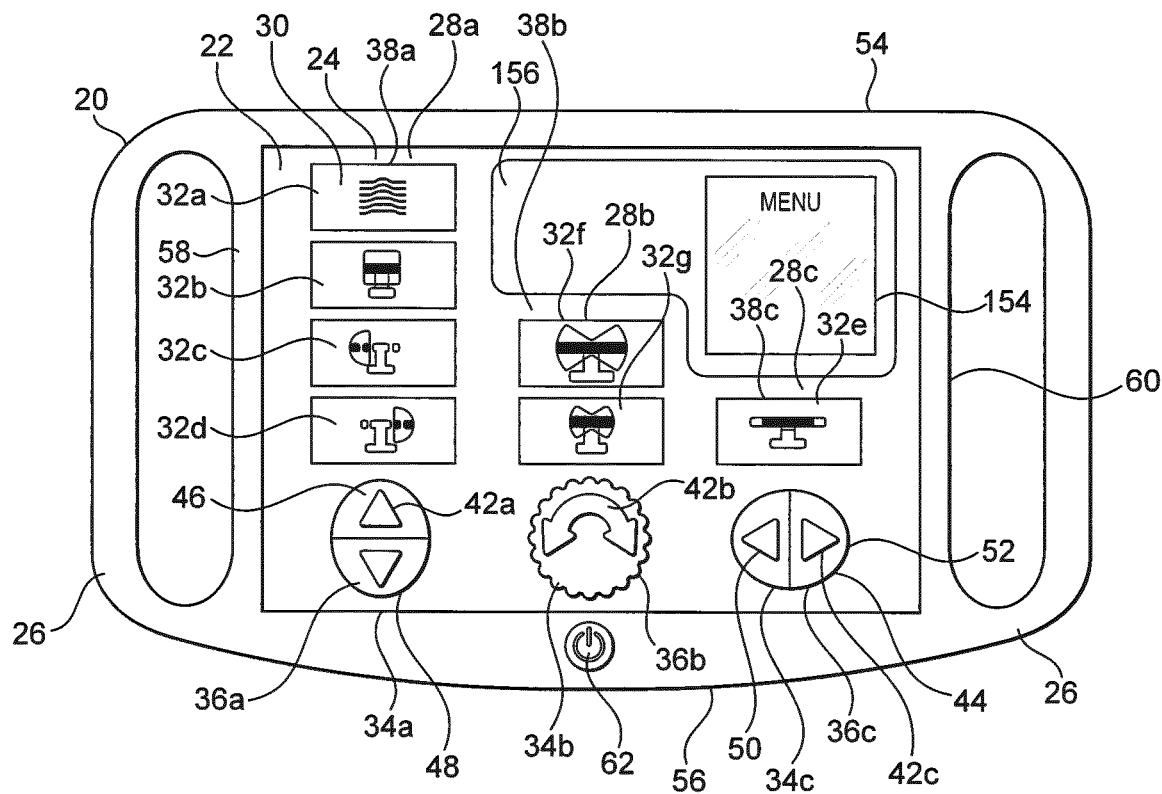
FIG. 2 is a schematic plan view of the handset of FIG. 1.

Referring to FIGS. 1 and 2, there is shown a handset 2 according to an embodiment of the present invention. The handset 2 is configured for controlling a device having a plurality of movable elements or parts, in particular a surgical operating table 4.

Any suitable surgical operating table configuration may be utilized in conjunction with the handset 2 of the present invention, provided that the function of the surgical operating table 4 correlates with the functional control provided by the handset 2. In one example as shown in FIG. 1, the surgical operating table 4 has movable elements which comprise segments of a tabletop 6 of the surgical operating table 4. In this example, these segments comprise a head section 8, an upper body section 10, a lower body section 12 and one or two leg sections 14. The movable elements also comprise a column 16 on which the tabletop 6 is mounted; however, other surgical tables incorporate an arm instead of a column for raising and lowering the tabletop.

A mechanism, generally indicated by reference numeral 18, is provided in the surgical operating table 4 which can be controlled to incline the tabletop 6 in a Trendelenburg position, in which the head section 8 is lowered relative to the other sections of the tabletop 6, and in a Reverse Trendelenburg position, in which the head section 8 is raised relative to the other sections of the tabletop 6, by rotating the tabletop 6 about a transverse trend axis extending across the tabletop 6. The mechanism 18 also can be controlled to tilt the tabletop 6 by rotating the tabletop 6 about a longitudinal tilt axis extending along the tabletop 6.

Drive mechanisms are provided within the surgical operating table 4 to move the tabletop 6 to a desired position or configuration according to a command from the handset 2. Typically, the handset 2 is adapted to control the surgical operating table 4 by wireless communication. Alternatively, the handset 2 is adapted to control the surgical operating table 4 by a wired connection. The handset 2 is adapted translationally and/or rotationally to move individual segments of the tabletop 6 or the entire tabletop 6.

Thus, individual segments of the tabletop 6 or the entire tabletop 6 can be translationally moved in a vertical orientation, i.e. in an upward direction or a downward direction; the entire tabletop 6 can be translationally moved in a horizontal orientation, i.e. in a direction extending from the head section 8 to the one or two leg sections 14 or in an opposite direction; and/or the entire tabletop 6 can be rotationally moved about the transverse trend axis and/or the longitudinal tilt axis.

The handset 2 comprises a housing 20. A touchscreen display 22 is located on a front face 24 of the housing 20.

The housing 2 and touchscreen display 22 have the shape and configuration of a tablet. The housing may be provided with one or more handles 26 and is typically ergonomically configured to provide right-handed or left-handed manual operation by a user. Typically, two handles 26 are provided on opposite sides of the handset 2. A strap may be fitted to the handles 26 for fitting the handset 2 around the arm of a user or suspending the handset 2 around the neck of a user.

The touchscreen display 22 is divided into a plurality of zones 28. Each zone 28 includes at least one icon switch in the form of a touchscreen switch 30. Each touchscreen switch 30 is aligned with a respective associated icon 32. Each icon 32 identifies a respective element or group of elements of the device to be controlled by the respective touchscreen switch, in the illustrated embodiment the device being the surgical operating table 4.

As described above, in the illustrated embodiment the display is a touchscreen display 22; however, a display having physical icon switches 30 can alternatively be utilized in accordance with the present invention.

The handset 2 further comprises a plurality of physical switches 34 on the front face 24. Each physical switch 34 is associated with a respective zone 28. Each physical switch 34 is configured to control movement of the element or elements shown by the icon or icons 32 in the respective zone 28.

The handset 2 further comprises a control mechanism 35 within the housing 20 which is connected to the plurality of touchscreen switches 30 and the plurality of physical switches 34. The control mechanism 35 is arranged to generate an output control signal for transmission to the device, in the illustrated embodiment the device being the surgical operating table 4, in response to an input command at the plurality of touchscreen switches 30 and the plurality of physical switches 34.

Referring in particular to the arrangement of the zones 28, touchscreen switches 30 and physical switches 34 on the front face 24 of the housing 20, in the illustrated embodiment the plurality of zones 28 are serially arranged on the touchscreen display 22. Typically, the plurality of zones 28a, 28b, 28c form a series of columns 38a, 38b, 38c arranged across the touchscreen display 22.

By providing a series of columns 38a, 38b, 38c, each associated with a respective zone 28a, 28b, 28c, the touchscreen display 22 is ergonomically suitable for use by right-handed or left-handed users, as compared to an arrangement of rows arranged down the touchscreen display 22.

The touchscreen display 22 is adapted to highlight a respective associated icon 32 when the touchscreen switch 30 is manually pressed. For example, the touchscreen display 22 may be adapted to illuminate, or increase an illumination level of, a respective associated icon 32 when the touchscreen switch 30 is manually pressed. In the illustrated embodiment, the icons 32 are visible only when the touchscreen display 22 is electrically powered and is switched on. In an alternative embodiment, the icons 32 are visible when the touchscreen display 22 is not electrically powered and is switched off.

The plurality of physical switches 34 are correspondingly serially arranged on the touchscreen display 22. The plurality of physical switches 34 form a row 40 transversely extending across the touchscreen display 22. In the illustrated embodiment, each physical switch 34a, 34b, 34c is located at a lower end of a respective column 38a, 38b, 38c.

Each physical switch 34a, 34b, 34c is a mechanical switch which extends forwardly of the touchscreen display 22.

Each physical switch 34a, 34b, 34c is configured to control movement in opposite directions along a common orientation of the element or elements shown by the icon or icons 32 in the respective zone 28a, 28b, 28c. Each physical switch 34a, 34b, 34c has a physical shape associated with a respective orientation of movement of the element or elements shown by the icon or icons 32 in the respective zone 28a, 28b, 28c. The physical shape is defined by the shape of a peripheral edge 36a, 36b, 36c of the respective physical switch 34a, 34b, 34c.

For example, a translational motion in opposite directions along a common orientation for the element or elements of the table 4 is associated with an elongate physical shape, and peripheral edge 36a, 36c, of the physical switch 34a, 34c along the corresponding orientation, and a rotational motion in opposite directions about a common axis for the element or elements of the table 4 is associated with a rotational physical shape, and peripheral edge 36b, of the physical switch 34b. Each physical switch 34a, 34b, 34c has a physical indicator 42a, 42b, 42c on a front surface 44 thereof. The physical indicator 42a, 42b, 42c is associated with a respective orientation of movement of the element or elements shown by the icon or icons 32 in the respective zone 28a, 28b, 28c.

In the illustrated embodiment, the physical indicator 42a, 42b, 42c is defined by a three-dimensional relief on the front surface 44 of the respective physical switch 34a, 34b, 34c. Alternatively or additionally, the physical indicator 42a, 42b, 42c is defined by a difference in colour and/or contrast and/or by a marking on the front surface 44 of the respective physical switch 34a, 34b, 34c.

In the illustrated embodiment, each physical indicator 42a, 42b, 42c includes arrows pointing in opposite directions along the respective orientation of movement. In the illustrated embodiment, each physical switch 34a, 34b, 34c and/or physical indicator 42a, 42b, 42c has a respective individual colour and the colours of the physical switches and/or indicators are mutually different.

Each physical switch 34a, 34b, 34c is movable in opposite directions about a central position. Typically, each physical switch 34a, 34b, 34c is biased towards the central position. The control mechanism 35 is arranged so that an output speed control signal is generated by moving each respective physical switch 34a, 34b, 34c away from the central position. A speed value associated with the output speed control signal increases with increase in distance of the respective physical switch 34a, 34b, 34c away from the central position.

In the plurality of physical switches, a first physical switch 34a is configured to control movement of the element or elements along a first translational orientation and a second physical switch 34c is configured to control movement of the element or elements along a second translational orientation which is inclined to the first translational orientation.

In the illustrated embodiment, the first and second translational orientations are mutually orthogonal; the first translational orientation is associated with vertical motion of the element or elements and the second translational orientation is associated with horizontal motion of the element or elements.

Each of the first and second physical switches 34a, 34c has a respective pair of opposite ends 46, 48; 50, 52 and is adapted to control movement of the element or elements in a selected one of corresponding opposite directions when the respective end 46, 48; 50, 52 is manually pushed.

The first physical switch 34a is associated with vertical motion of the element or elements and the peripheral edge 36a of the first physical switch 34a is oriented along a direction extending between opposite upper and lower edges 54, 56 of the touchscreen display 22. Typically, the peripheral edge 36a of the first physical switch 34a is elliptical and a long axis of the elliptical shape is oriented along the direction extending between the opposite upper and lower edges 54, 56 of the touchscreen display 22.

In the illustrated embodiment, the first physical switch 34a is a single rocker switch or slider switch. A thumb or finger can be placed at the centre of the first physical switch 34a and then rocked or slid in a desired direction to activate the switch in a desired direction, i.e. up or down, by pressing down on the selected end 46, 48 or pressing anywhere on the switch 34a to cause sliding.

Alternatively, a selected end 46, 48 of the first physical switch 34a can be pushed down by the finger or thumb to activate the switch in a desired direction.

In an alternative embodiment, the first physical switch 34a may comprise a pair of individual switches which are closely adjacent to each other in a vertical direction and are activated using similar rocking or pressing motions as described above for the single rocker switch.

In the illustrated embodiment, the first zone 28a includes four icons 32. Operation of the icons 32, touchscreen switches 30 and the first physical switch 34a associated with the first zone 28a controls vertical motion of the surgical operating table. The top icon 32a in the column 38a functions to level the tabletop 6; the next lower icon 32b in the column 38a functions to raise or lower the height of the tabletop 6; the next lower icon 32c in the column 38a functions to raise or lower the leg section(s) 14 of the tabletop 6; and the next lower icon 32d in the column 38a functions to raise or lower the head section 8 of the tabletop 6.

The second physical switch 34c is associated with horizontal motion of the element or elements and the peripheral edge 36c of the second physical switch 34c is oriented along a direction extending between opposite left-hand and right-hand sides 58, 60 of the touchscreen display 22. Typically, the peripheral edge 36c of the second physical switch 34c is elliptical and a longitudinal axis of the elliptical shape is oriented along the direction extending between the opposite left-hand and right-hand sides 58, 60 of the touchscreen display 22.

In the illustrated embodiment, as described above for the first physical switch 34a, the second physical switch 34c is a single rocker switch or slider switch. A thumb or finger can be placed at the centre of the second physical switch 34c and then rocked or slid in a desired direction to activate the switch in a desired direction, i.e. left or right, by pressing down on the selected end 50, 52 or pressing anywhere on the switch 34a to cause sliding.

Alternatively, a selected end 50, 52 of the second physical switch 34c can be pushed down by the finger or thumb to activate the switch in a desired direction. In an alternative embodiment, the second physical switch 34c may comprise a pair of individual switches which are closely adjacent to each other in a horizontal direction and are activated using similar rocking or pressing motions as described above for the single rocker switch.

In the illustrated embodiment, the second zone 28c includes one icon 32e in column 38c. Operation of the icon 32e, touchscreen switch 30 and the second physical switch 34c associated with the second zone 28c controls horizontal motion of the surgical operating table. The icon 32e in the column 38c functions to slide the tabletop either cranially or caudally.

A third physical switch 34b is configured to control movement in a rotational orientation. The third physical switch 34b is associated with rotational motion of the element or elements. The third physical switch 34b is rotatable in opposite rotational directions and is adapted to control movement of the element or elements in a selected one of corresponding opposite directions when the third physical switch 34b is manually rotated in a respective selected direction of the opposite rotational directions. Typically, the peripheral edge 36b of the third physical switch 34b is a surface of rotation, which may be circular, although other configurations, such as a regular polygon, for example an octagon, may be used.

In the illustrated embodiment, the third physical switch 34b is a single rotary knob, but any other rotary control may be used.

In the illustrated embodiment, the third zone 28b includes two icons 32. Operation of the icons 32, touchscreen switches 30 and the third physical switch 34b associated with the third zone 28b controls rotational motion of the surgical operating table. The top icon 32f in the column 38b functions to rotate the tabletop 6 in trend or reverse trend; and the bottom icon 32g in the column 38b functions to rotate the tabletop by tilting left or right relative to the longitudinal axis of the tabletop 8.

In the illustrated embodiment, the touchscreen display 22 may also include a menu section 154, which may be used to set up the device and from which other movements or functions of the surgical operating table 2 may be controlled. An auxiliary area 156 on the touchscreen display 22 may control other functions or components of the surgical operating table 2.

A physical power ON/OFF switch 62 is located on the housing 20. The ON/OFF switch 62 can be configured to switch ON/OFF the handset 2 and/or the table 4.

In an alternative arrangement, an independent STOP switch (not shown) may be provided which stops all motions of the table 4, and optionally kills the power to the table 4.

In operation, when it is desired to move the tabletop 8 or a segment of the tabletop 8, a user manually presses on the required icon 32 to select the desired movement function. Pressing the icon 32 causes the associated touchscreen switch 30 to be switched on. The icon 32 is then highlighted or illuminated to provide a visual indication that the icon 32 has been selected.

The selected movement function associated with the selected icon 32 is then controlled by moving the associated physical switch 34 which is in the same zone 28 as the selected icon 32. The physical switch 34 can be operated by pressing a selected one of two ends or moving in a selected one of two opposite directions.

This permits a desired movement direction along the selected orientation, vertical, horizontal, or rotation, to be readily selected, and optionally controlled in a back-and-forth adjustment by alternately moving the two ends of the physical switch 34 or rotating the physical switch 34 in opposite directions.

Increased pressure on the ends or increased rotation to cause increased motion of the physical switch 34 from the central position causes increased speed of motion of the controlled tabletop 8 or segment of the tabletop 8.

Operation of the physical switch 34 causes the control mechanism 35 to generate an output control signal for transmission to the device in response to an input command at the plurality of touchscreen switches 30 and the plurality of physical switches 34.

After a preset cut-out period, the selected icon 32 is automatically deselected by the control mechanism 35.

Figure 3:
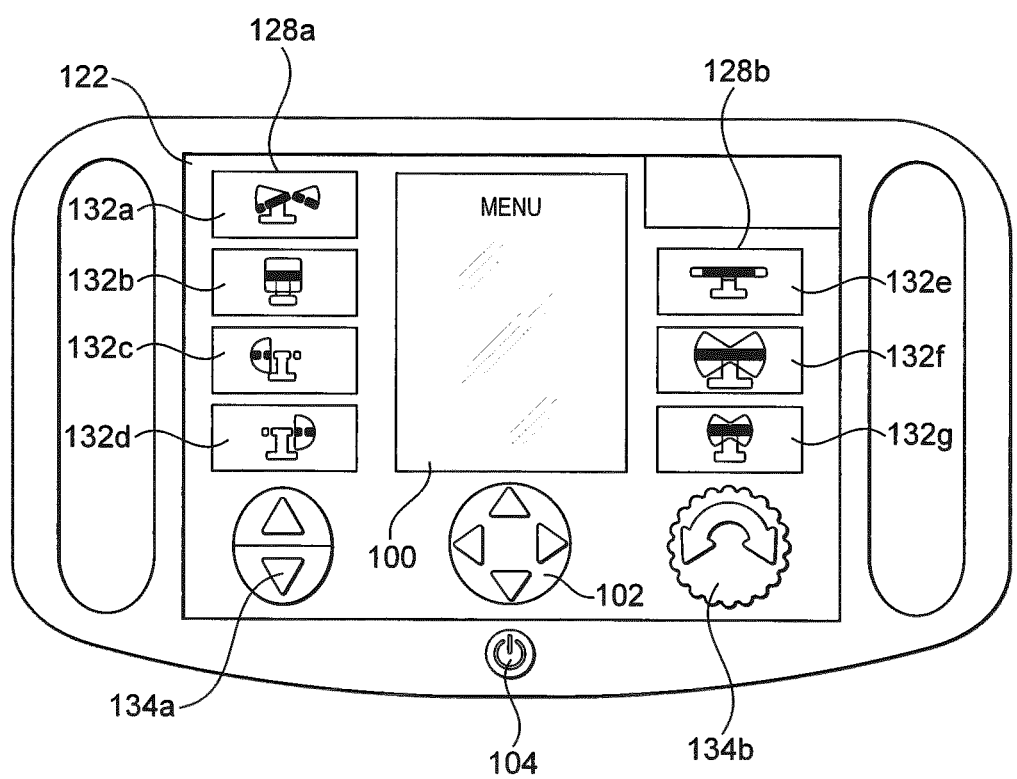
FIG. 3 is a schematic plan view of a handset according to a second embodiment of the present invention.

FIG. 3 is a schematic plan view of a handset according to a second embodiment of the present invention.

In this embodiment, there are two zones 128a, 128b on the touchscreen display 122. Again, although a touchscreen display 122 is illustrated, the display may alternatively be provided with physical icon switches, as described above for the previous embodiment.

A first zone 128a is associated with vertical movement, and includes a plurality of icons 132a, 132b, 132c, 132d illustrating elements of a surgical operating table to be moved vertically. The first zone 128a includes a first physical switch 134a, similar to switch 34a of FIGS. 1 and 2, for moving the selected element vertically in an up or down direction of movement, at a speed controlled by pressure applied to the first physical switch 134a which moves the first physical switch 134a away from the central position.

A second zone 128b is associated with rotational movement and horizontal movement, and includes a plurality of icons 132e, 132f, 132g illustrating elements of a surgical operating table to be moved horizontally (132e) or rotationally (132f, 132g). Optionally, a further icon may be provided in any column to dispose the table in a level position. The second zone 128b includes a second physical switch 134b, similar to switch 34c of FIGS. 1 and 2, for moving the selected element to a level position, or horizontally or rotationally in a selected one of two opposite directions, at a speed controlled by the degree of angular rotation applied to the second physical switch 134b which moves the second physical switch 134b away from the central position.

The touchscreen display 122 further includes a central menu region 100, located between the first and second zones 128a, 128b. Beneath the central menu region 100 is physical switch 102, for example a four-direction physical rocker switch 102, for selecting functions from the menu in the central menu region 100. This embodiment avoids the cost of a touchscreen for the central menu region, and the first and second zones 128a, 128b may comprise a touchscreen comprising an array of plural individual displayed icons, each of which is associated with a respective switch device located beneath the respective icon.

A further physical switch 104 as a power ON/OFF button is also provided. The ON/OFF switch 104 can be configured to switch ON/OFF the handset 2 and/or the table 4.

In an alternative arrangement, an independent STOP switch (not shown) may be provided which stops all motions of the table 4, and optionally kills the power to the table 4.

Various modifications can be made to the above-described embodiments without departing from the scope of the present invention, which is defined by the claims.

The invention claimed is:

1. A handset for controlling a device having a plurality of movable elements, the handset comprising a housing, a display on a front face of the housing, the display being divided into a plurality of zones, each zone including at least one icon switch, each icon switch being aligned with a respective associated icon, wherein each icon identifies a respective element or group of elements of a device to be controlled by the respective icon switch, wherein the plurality of zones are serially arranged on the display to form a series of columns of icon switches arranged on the display, each zone comprising a respective column and at least one of the columns comprising a plurality of icon switches, and a plurality of physical switches on the front face, each physical switch being associated with a respective zone, and wherein each physical switch is configured to control movement of the element or elements shown by the icon or icons in the respective zone, wherein a first physical switch is configured to control movement of the element or elements shown by the icon or icons in the respective zone along a first translational orientation associated with vertical motion of the element or elements of the device, a second physical switch is configured to control movement of the element or elements shown by the icon or icons in the respective zone along a second translational orientation which is orthogonal to the first translational orientation and is associated with horizontal motion of the element or elements of the device a third physical switch is configured to control movement of the element or elements shown by the icon or icons in the respective zone in a rotational orientation, and a control mechanism within the housing which is connected to the plurality of icon switches and the plurality of physical switches, the control mechanism being arranged to generate an output control signal for transmission to the device in response to an input command at the plurality of icon switches and the plurality of physical switches.

2. A handset according to claim 1 wherein each physical switch is configured to control movement of the element or elements in opposite directions along a common orientation of the element or elements shown by the icon or icons in the respective zone.

3. A handset according to claim 1 wherein each of the first and second physical switches has a respective pair of opposite ends and is adapted to control movement of the element or elements in a selected one of corresponding opposite directions when the respective end is manually pushed.

4. A handset according to claim 1 wherein the third physical switch is rotatable in opposite rotational directions and is adapted to control movement of the element or elements in a selected one of corresponding opposite directions when the third physical switch is manually rotated in a respective selected direction of the opposite rotational directions.

5. A handset according to claim 1 wherein each physical switch has a physical shape associated with a respective orientation of movement of the element or elements shown by the icon or icons in the respective zone.

6. A handset according to claim 5 wherein the physical shape is defined by the shape of a peripheral edge of the respective physical switch.

7. A handset according to claim 6 wherein the peripheral edge of the first physical switch is elongate and oriented along a direction extending between opposite upper and lower edges of the display.

8. A handset according to claim 7 wherein the peripheral edge of the first physical switch is elliptical and a long axis of the elliptical shape is oriented along the direction extending between the opposite upper and lower edges of the display.

9. A handset according to claim 6 wherein the peripheral edge of the second physical switch is elongate and oriented along a direction extending between opposite left-hand and right-hand sides of the display.

10. A handset according to claim 9 wherein the peripheral edge of the second physical switch is elliptical and a longitudinal axis of the elliptical shape is oriented along the direction extending between the opposite left-hand and right-hand sides of the display.

11. A handset according to claim 6 wherein the peripheral edge of the third physical switch is a surface of rotation.

12. A handset according to claim 11 wherein the surface of rotation is circular.

13. A handset according to claim 1 wherein each physical switch has a physical indicator on a front surface thereof, the physical indicator being associated with a respective orientation of movement of the element or elements shown by the icon or icons in the respective zone.

14. A handset according to claim 13 wherein the physical indicator is defined by a three-dimensional relief on the front surface of the respective physical switch, and/or the physical indicator is defined by a difference in colour and/or contrast and/or by a marking on the front surface of the respective physical switch.

15. A handset according to claim 1 wherein the display is adapted to highlight a respective associated icon when the touchscreen switch is manually pressed and wherein the display is adapted to illuminate, or increase an illumination level of, a respective associated icon when the icon switch is manually pressed.

16. A handset according to claim 1 wherein each physical switch is located at a lower end of a respective column.

17. A handset according to claim 1 wherein the plurality of physical switches are serially arranged on the display.

18. A handset according to claim 17 wherein the plurality of physical switches form a row transversely extending across the display.

19. A handset according to claim 1 wherein each physical switch is movable in opposite directions about a central position, and optionally is a rocker switch, a slider switch or a rotatable switch, and each physical switch is biased towards the central position.

20. A handset according to claim 19 wherein the control mechanism is arranged so that an output speed control signal is generated by moving each respective physical switch away from the central position.

21. A handset according to claim 20 wherein a speed value associated with the output speed control signal increases with increase in distance of the respective physical switch away from the central position.

22. A handset according to claim 1 wherein the device is a surgical operating table and wherein the elements comprise segments of a tabletop of the surgical operating table.

* * * * *